Feb. 17, 1970     W. E. HUNZIKER ET AL     3,496,366
APPARATUS AND METHOD FOR DETERMINING THE COUNT
OF TEXTILE MATERIALS

Filed May 24, 1966     2 Sheets-Sheet 1

INVENTORS
WALTER E. HUNZIKER
ERWIN R. MURBACH
BY
*Kenyon & Kenyon*
ATTORNEYS

United States Patent Office 3,496,366
Patented Feb. 17, 1970

3,496,366
APPARATUS AND METHOD FOR DETERMINING THE COUNT OF TEXTILE MATERIALS
Walter Emil Hunziker and Erwin Robert Murbach, Uster, Switzerland, assignors to Zellweger, Ltd., Uster, Switzerland, a corporation of Switzerland
Filed May 24, 1966, Ser. No. 552,564
Claims priority, application Switzerland, June 4, 1965, 7,976/65
Int. Cl. G01n 21/30; G06m 7/00; H01j 39/12
U.S. Cl. 250—219                14 Claims

ABSTRACT OF THE DISCLOSURE

The count of the textile material is determined by passing the material through a measuring channel which compacts the material to a predetermined cross-section and wherein an electromagnetic means is mounted to determine the density of the material in the channel at a predetermined point. This electromagnetic means is mounted in a pair of rotatable windows which rotate relative to the material so as to effect cleaning of any dust or lint from the windows which could otherwise adversely effect an accurate measurement of the count.

---

This invention relates to an apparatus and method for determining the count of textile materials. More particularly, this invention relates to an apparatus and method for determining the count of traveling lengths of textile materials in spinning mills.

Heretofore, measuring devices for defining the weight per unit of length, i.e. the count, of textile material as produced in spinning mills have been known. These devices have been comprised of a source of light positioned at one side of a measuring channel through which the textile material traveled and a photoelectric cell positioned on the other side. In addition, the measuring channel has been provided with windows, for example, of glass, at the points where the light beam from the light source has passed to the photoelectric cell. The fiber structure of the textile material and the extensive deposition of fiber residues of all kind connected therewith have not permitted any portions of the measuring channel to be left uncovered for affording light passage because operation of the measuring device would be impaired by the deposits after a short time.

In operation, the textile material has absorbed and reflected a part of the incident light so that the photoelectric cell has received only the remaining part of the light which has been closely related to the weights per unit of length, i.e. the count of the fiber ribbon contained in the measuring channel. The electric signal thereby produced in the photoelectric cell has been used as a criterion for the cross section of the fiber ribbon or for the fiber mass passing through the measuring channel.

It has also been known to provide an additional photoelectric cell in a light beam controlled by means of an adjustable blind whereby the additional photoelectric cell has produced a reference voltage for compensating the brightness changes inherent in the light source.

However, the windows in the measuring channel have been subjected to considerable fouling because they have been exposed to continuous contact with the material being tested as it passes through the measuring channel thereby having effected a static charge and smearing of the windows. Such fouling has become so great in a short time that the light passage has been reduced and the measuring result adulterated. Also, undesired deposits have occurred when the windows have been shaped so as to reduce or increase the surfaces grazed by the material being tested.

Accordingly, it is an object of this invention to provide an apparatus and method for determining the count of a traveling textile material having a measuring channel wherein the windows for permitting electromagnetic radiation are continuously cleaned.

It is another object of this invention to continuously clean the windows of a measuring channel for determining the count of a textile material by passing the textile material thereover.

It is another object of this invention to provide an apparatus and method to compact a traveling textile material into a homogeneous density to determine the count thereof.

It is another object of this invention to provide an apparatus for determining the count in traveling textile materials which is capable of continuous operation for extended periods of time.

It is another object of this invention to provide an apparatus for determining the count in traveling textile materials which is capable of producing continuous measurement signals for monitoring and regulating the draft in drafting machines.

Generally, the invention provides an apparatus for determining the count of a textile material which comprises a measuring channel having windows therein for affording passage of electromagnetic radiation across the channel, a pair of translucent rotatable elements disposed on opposite sides of the measuring channels which project into the plane of the channel to form a constriction therewith, and an electromagnetic radiation assembly disposed in a plane passing through the constriction in the measuring channel. The electromagnetic radiation assembly produces an electromagnetic radiation which passes through the translucent rotatable members so that an accurate reliable measurement of the count of a textile material traveling through the measuring channel can be made during rotation of the translucent members without adulteration by dust or fiber deposits.

In addition, to further insure reliable measurements, another form of cleaning device is incorporated in the apparatus. This device is in the form of an air circulation assembly which passes a current of dustfree air against the translucent members to carry away any accumulations of dust and fiber particles.

Further, the electromagnetic radiation assembly produces measurement signals in proportion to the measured count valve so as to provide continuous signals for monitoring and regulating the draft in drafting machines operably interconnected with the textile measuring channel.

The invention provides a method for determining the count of a traveling textile material which comprises the steps of directing the traveling textile material through a constricted channel to reduce the cross section of the textile material to a homogeneous density passing an electromagnetic radiation through the traveling textile material in the constricted channel, measuring the electromagnetic energy leaving the textile material to determine the count thereof and continuously clearing the path of electromagnetic radiation of dust and fiber deposits from the traveling textile material whereby accurate count measurements are made.

These and other objects and advantages of the invention will become more apparent from the following detailed description and appended claims taken in conjunction with the accompanying drawings in which:

Figure 1:
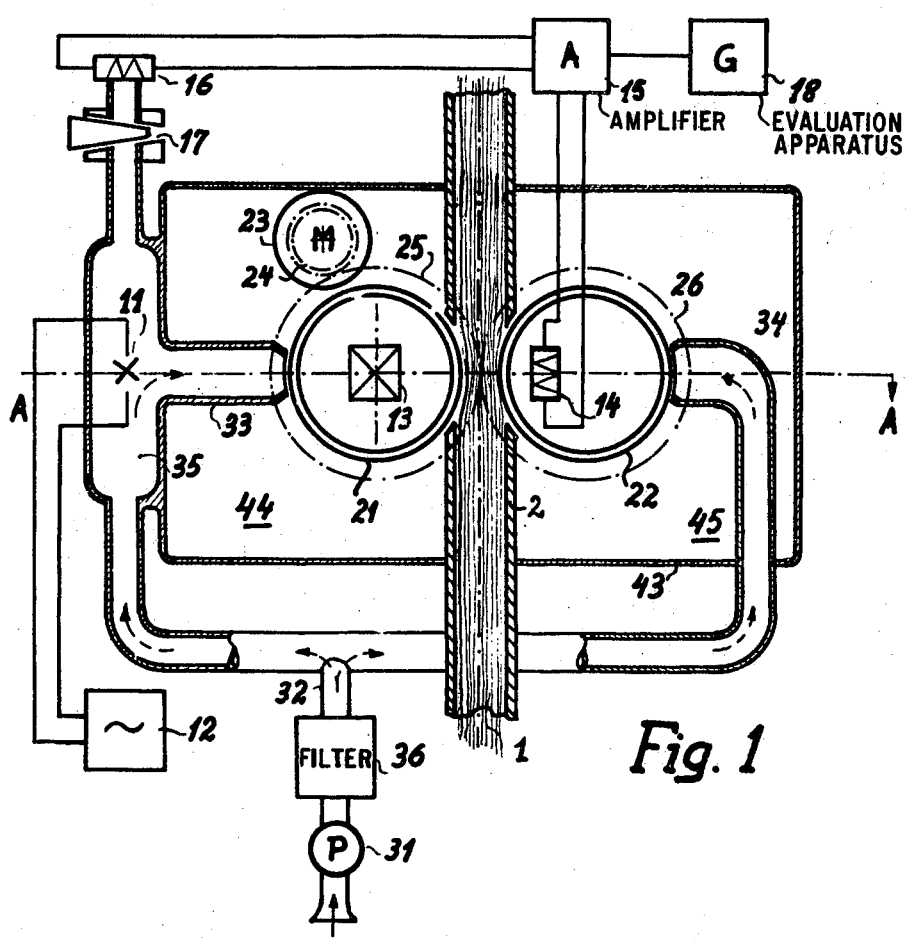
FIG. 1 illustrates a schematic part sectional plan view of an apparatus according to the invention.
Figure 2:
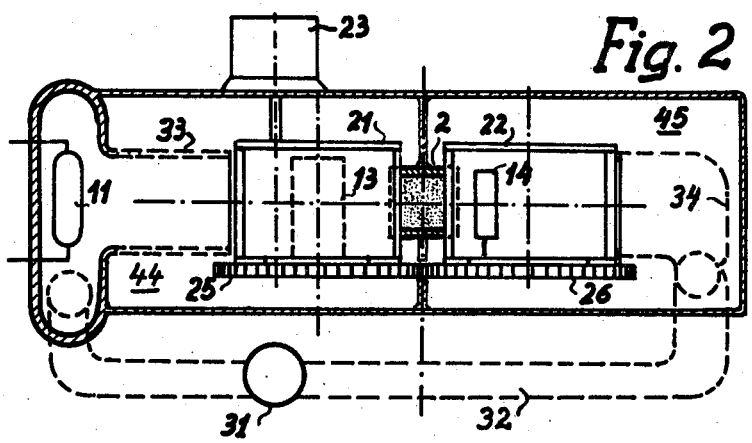
FIG. 2 illustrates a part sectional elevational view of the apparatus of FIG. 1.

Referring to FIGURES 1 and 2, a measuring channel 2 is disposed across a beam of electromagnetic radiation which passes along a line A—A. The beam is, for example, a light beam of a conventional optical measuring system. The cross section of the channel 2 is such that a textile material 1 which is easily compressible is compacted therein so as to have a cross section which is about one-half of the cross section of the free material, i.e. of the material before it enters the measuring channel 2. In this way, a substantially homogeneous distribution of the fiber mass is obtained in the cross section where the light beam passes through the measuring channel 2. It is noted that a homogeneous distribution is needed for obtaining an output signal of the electromagnetic radiation which corresponds to the count of the fiber ribbon.

The optical measuring system comprises a source of light 11, an optical device 13 on one side of the measuring channel 2, a photoelectric cell 14 on the opposite side of the measuring channel, and light barriers 43 for screening off outside light. Alternatively, a system having the light source 11 and the photoelectric cell 14 placed at the same side of the measuring channel 2 can be utilized so that the incident light serves as a measure of the quantity of light reflected by the textile material.

The light source 11 is fed from a source of current 12, for example, a luminous-discharge lamp of the flash bulb type whereby the source of current 12 forms the generator for continuous delivery of flashlight pulses.

The photoelectric cell 14 is connected to an amplifier 15 which amplifies the electric signal corresponding to the quantity of tested textile material in the measuring channel 2 and transmits the signals to a suitable evaluation apparatus 18.

Besides the light beam for testing the textile material, an additional light beam emanating from the light source 11 is directed through an adjustable shutter 17 to a reference photoelectric cell 16 to produce a second signal. The signal produced by the photoelectric cell 16 is conducted to the amplifier 15 where it is combined as a reference voltage with the signal produced by the photoelectric cell 14. In this way brightness variations of the light from the light source 11 are substantially neutralized. The adjustable shutter 17 which, for example, is in the form of a neutral wedge, is disposed in the path of the additional light beam to afford setting of any desired set point value for the count.

A pair of translucent cylindrical hollow element 21 and 22 is placed in the light path between the light source 11 and the photoelectric cell 14 to form portions of the wall of the measuring channel 2. The distance between the parallel axes of the elements 21 and 22 is such that the cross section of the channel 2 is narrowed or constricted in the plane defined by said axes thereby additionally compressing the tested textile material 1 at this location. The friction between the tested textile material and the elements 21 and 22 is thus increased so as to effect intensive cleaning of the exterior surfaces of the elements 21 and 22 of any deposits.

In order to prevent any harmful influence on the light path by the deposits ahead of and after the constricted portion of the measuring channel 2 the hollow elements 21, 22 are rotated by means of a motor 23 and gears 24, 25, 26. This causes periodic placement of the deposits on the elements 21, 22 into the narrow portion of the measuring channel where the deposits are wiped off by the traveling tested textile material 1. The speed of rotation of the elements 21 and 22 is such that there is insufficient time for deposition of any quantity of impurities on the elements which would adversely affect the light path. Thus, elements 21, 22 remain uniformly clean and translucent for any length of time.

The optical device 13, for example, a diffuser, is located in the element 21 which is next to the light source 11 to distribute the light from the source 11 over the entire portion of the measuring channel whose wall is formed by a sector of the element 21. The photoelectric cell 14 is positioned in a non-rotatable manner within the element 22 and is rigidly oriented with respect to the incident light beam. The diffuser 13 as well as the photoelectric cell 14 are protected by the elements 21 and 22, respectively, against fouling.

Figure 3:
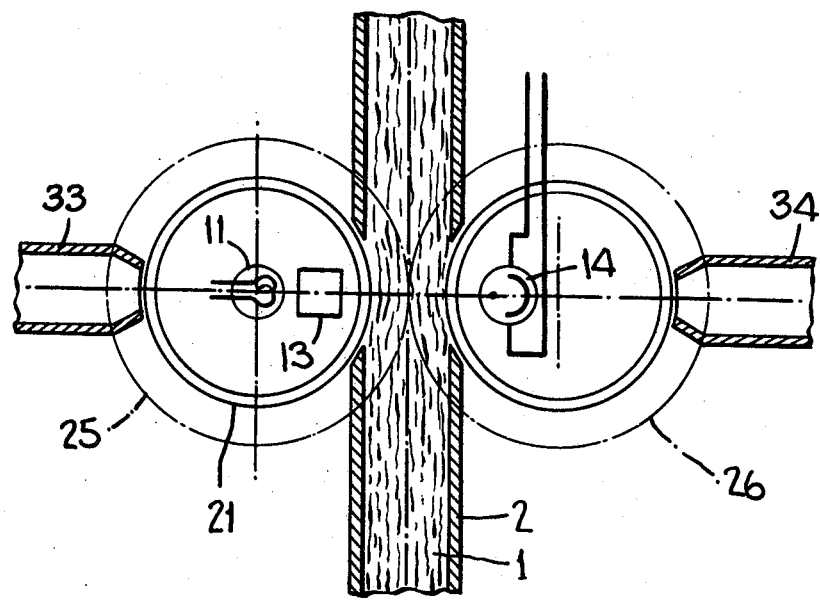
FIG. 3 illustrates a modification of the apparatus of FIG. 1.

Referring to FIG. 3, instead of utilizing an optical device in the element 21, the light source 11 may be placed in the element 21 and secured against rotation so that the light source is stationary relative to the direction of the light beam while the element 21 rotates.

In any event, movable joints which are dustproof and of known structure are provided between the stationary support of the light source and the photoelectric cell in the hollow elements 21 and 22.

Aside from the deposit of dust and the like on the parts which are in contact with the tested textile material 1, dust and fly may also accumulate on other surfaces of the apparatus. Further, because of the unavoidable clearances between the elements 21 and 22 and the wall of the measuring channel, dust and fiber fly may also accumulate at locations which are not cleaned by the tested textile material 1. Since such would allow dusting in the reach of the light beam, particularly at the light source 11 and at the light barriers 43, and a resulting impairment in the test results additional cleaning devices are incorporated in the apparatus to avoid such. According to the invention, an air circulation assembly blows a dustfree current of air against each of the elements 21 and 22 whereby dust and fiber particles are carried away from the surfaces of the elements, the excess pressure in chambers 44 and 45 formed by the light barriers 43 preventing entry of fly thereinto. Should any fiber fly accumulate in the chambers 44 and 45 it is carried away to the outside by the air current.

The air current is produced by a pump 31 and conducted through a filter 36. One part of the air current is then conducted through a conduit 32 into a chamber 35 containing the light source 11 and therefrom through a channel 33 against the element 21 and another part of the air current is conducted through a conduit 34 against the element 22. The narrow clearance between the channel 33 and the element 21 and the openings (not shown) which communicate with the outside effect an air current in the chamber 44 which tears off fly accumulated on the element 21 and takes along fly accumulated in the chamber 44 and carries the fly to the outside. The same also takes place in the chamber 45.

It is noted that the methods and devices according to the invention are not limited to the use of visible light between a light source and a light receiver, since any desired frequency range of the spectrum of electromagnetic radiation, particularly such ranges which have particularly advantageous qualities with respect to the textile material can be used. The elements 21, 22 however must be made of material permeable to the elected radiation and the surface of the material must be sufficiently hard to resist damage by the continuously passing textile material.

The continuous cleaning of the elements 21 and 22 from sticky deposits and the removal of adherent dust and fiber particles according to the invention permit continuous operation of the measuring apparatus through long periods of time. This is of great importance if the apparatus is used in combination with continuously operating processing machines where continuous supervision of the test results is not possible or, if the test results are used for monitoring and regulating the process, for example, for monitoring and regulating the draft in drafting arrangements. Such monitoring and regulating depends on unadulterated measuring signals which are always proportional with the measured value.

Having thus described the invention, it is not intended that it be so limited as changes may be readily made

What is claimed is:

1. An apparatus for defining the count of textile material comprising:
a measuring channel for the passage of textile material therethrough, said measuring channel having a cross section constricted in all transverse directions to homogenize the density of the textile material across a cross section of the textile material thereof within said channel,
movable window means permeable to electromagnetic radiation and contiguous with said channel, said window means projecting into said channel for continuous contact with the textile material in said channel,
a source of electromagnetic radiation,
means for directing electromagnetic radiation from said source through said window means into and out of said measuring channel,
means for receiving electromagnetic radiation from said measuring channel, said means for receiving being capable of measuring the intensity of the radiation received from said measuring channel for defining the count of the textile material, and
means for moving said window means relative to the textile material whereby the textile material cleans said window means.

2. An apparatus as set forth in claim 1 wherein said measuring channel has a flow area of a cross section less than the cross section of the textile material prior to entrance into said measuring channel.

3. An apparatus as set forth in claim 1 wherein said measuring channel has a flow area of a cross section substantially one half of the cross section of the textile material prior to entrance into said measuring channel.

4. An apparatus as set forth in claim 1 wherein said movable means form a constriction in said channel for the passage of textile material therethrough.

5. An apparatus as set forth in claim 1 wherein said window means are rotatable hollow elements, each of said elements having a surface portion forming part of a wall with said channel for contact with the textile material and a surface portion outside of said channel.

6. An apparatus as set forth in claim 5 wherein said means for directing electromagnetic radiation is at least in part placed inside one of said hollow elements.

7. An apparatus as set forth in claim 5 wherein said means for receiving electromagnetic radiation is at least in part placed inside one of said hollow elements.

8. An apparatus as set forth in claim 5 wherein said means for directing electromagnetic radiation is at least in part placed inside one of said hollow elements, and said means for receiving electromagnetic radiation is at least in part placed inside a second of said hollow elements.

9. An apparatus as set forth in claim 5 wherein said source of electromagnetic radiation is at least in part placed inside one of said hollow elements.

10. An apparatus as set forth in claim 5 which further comprises means for blowing a current of air onto said surface portions of said elements outside of said channel for removing impurities from said surface portions and cleaning said surface portions.

11. A method for defining the count of traveling textile material in spinning mills which comprises the steps of directing the textile material through a channel with a cross section constricted in all directions to homogenize the density distribution of the textile material across a cross section thereof, passing an electromagnetic radiation through the traveling textile material in the constricted channel, measuring the electromagnetic energy leaving the textile material to determine the count thereof, and cleaning the path of electromagnetic radiation of dust and fiber deposits from the textile material by means of moving windows in contact with the textile material and through which the radiation passes.

12. A method as set forth in claim 11 wherein the textile material passing through the measuring channel carries away the dust and fiber deposits.

13. A method as set forth in claim 11 which further comprises the step of conducting a current of air contiguously to the path of electromagnetic radiation for taking along impurities for additional cleaning.

14. A method as set forth in claim 13 wherein said current of air removes impurities from the sphere of influence of the electromagnetic radiation.

References Cited

UNITED STATES PATENTS

| | | | |
|---|---|---|---|
| 1,176,147 | 3/1916 | Keen | 250—219 X |
| 3,028,502 | 4/1962 | Schiffbauer et al. | 250—219 |
| 3,116,621 | 1/1964 | Klein et al. | 250—219 X |
| 1,978,589 | 10/1934 | McFarlane | 250—238 |
| 2,244,362 | 6/1941 | Hartig | 250—218 |
| 2,361,217 | 10/1944 | Lewis | 19—240 |
| 2,466,615 | 4/1949 | Rusca et al. | |
| 2,682,144 | 6/1954 | Hare | 19—240 |
| 2,810,836 | 10/1957 | Hutgens | 73—159 |
| 3,157,915 | 11/1964 | Gilbo | 19—240 |
| 3,292,493 | 12/1966 | Brown et al. | 250—219 |
| 3,305,688 | 2/1967 | Lamparter | 250—219 |

WALTER STOLWEIN, Primary Examiner

U.S. Cl. X.R.

250—223; 356—242